June 3, 1952

A. W. HERBENAR 2,598,694

PROCESS FOR HEAT-AND-QUENCH HARDENING
IRREGULAR OBJECTS SUCH AS GEARS

Filed May 7, 1947

*INVENTOR*
ANTON W. HERBENAR

BY Maurice A. Crews
*ATTORNEY*

Patented June 3, 1952

2,598,694

UNITED STATES PATENT OFFICE 2,598,694

PROCESS FOR HEAT-AND-QUENCH HARDENING IRREGULAR OBJECTS SUCH AS GEARS

Anton W. Herbenar, Ferndale, Mich., assignor, by mesne assignments, to The Ohio Crankshaft Company, Cleveland, Ohio, a corporation of Ohio Application May 7, 1947, Serial No. 746,462

2 Claims. (Cl. 148—10.5)

This invention relates to a process of hardening irregular induction heatable and quench hardenable objects such as gears and the like which are not subject to uniform heating by induction heating means, to avoid localized stresses which might cause failure, and has for an object the provision of improvements in this art.

More particularly it is an object to equalize or graduate the unequal heating produced by induction electrical means before the article is quenched to harden it.

A more specific object of the invention is the provision of a new and improved method of heat and quench hardening ferrous articles of manufacture which comprises rapidly heating thin surface portions only of the article to a temperature above the austenizing temperature while other portions of the object remain below the austenizing temperature, simultaneously rapidly lowering the temperature of the heated portion to a temperature slightly above the $M_s$ temperature while, at the same time, heating the unheated portion of the article above the $M_s$ temperature, continuing this simultaneous cooling and heating until substantially the entire object is approximately the same temperature and further quenching the workpiece to a temperature below the $M_f$ temperature.

The electrical induction heating process is very desirable for hardening many objects, particularly high carbon steel, because it can be used to produce a thin zone of hard metal at the surface, leaving a tough matrix or backing of softer metal. This is particularly useful for irregular articles such as gears and the like.

But the induction heating of gears and the like presents difficulties because the roots and crests of the teeth are heated at different rates and consequently are not at a uniform temperature prior to quenching. Also, due to the irregular shapes, the rate of quenching is not at all uniform. Thus, large temperature differentials are set up within the object which, due to the contraction of the metal on cooling, cause internal stresses of considerable magnitude. The problems are further aggravated by the fact that: as the surfaces of the metal are transformed from the austenitic to the martensitic state, an expansion of the metals takes place. The problem is even further aggravated by the existence of the substantially cold or relatively unheated portions of the gear remote from the surfaces being hardened. This cold portion serves as a relative rigid support, the dimensions of which do not change during the heating operation. This abrupt temperature transition results upon quenching in high permanent residual stresses and thus results in excessive distortion and decreased life due to hastened fatigue.

According to the present method the gears or other irregular objects are inductively heated above the critical or austenizing temperature over as much surface area as is accessible or as is desired, thus taking full advantage of the rapid high heating of a very thin zone at the surface; but instead of quenching immediately after heating to below the $M_s$ temperature, the heated object is first subjected to a rapid heat graduation or equalizing treatment to bring the entire surface to be hardened rapidly to a substantially uniform temperature above the temperature at which martensite forms, after which the object is quenched to harden the entire heated surface.

The invention may be practiced by the mechanism illustrated in the accompanying drawings, wherein.

Figure 1:
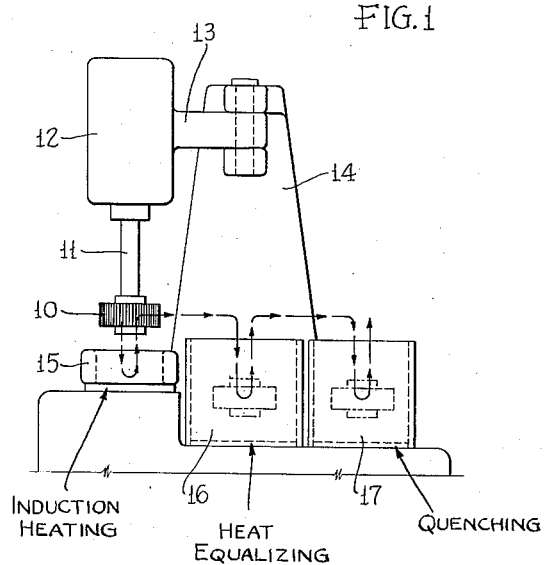
Figure 1 is a vertical elevation.
Figure 2:
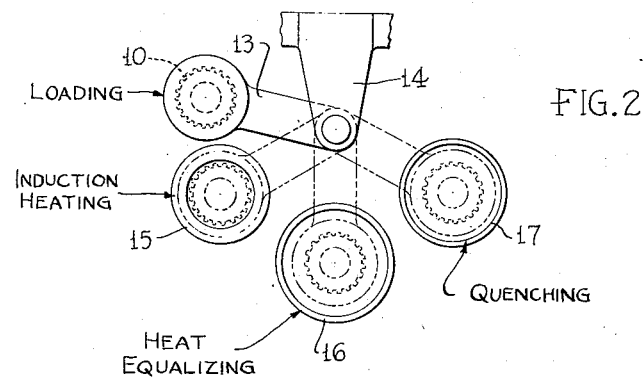
Figure 2 is a top plan view.

Referring to the drawings, an irregular workpiece, such as a gear 10, is carried by a holder 11 which may be moved up and down by a piston-cylinder device 12 and be swung around on an arm 13 carried on a support 14. The gear may be loaded at a first station, then moved to a second station where it is heated by an induction heating device 15, then moved into a heat equalizing bath 16 and finally quenched in a bath or spray device 17.

The equalizing bath is conveniently a molten salt mixture which is maintained at a temperature high enough to avoid quenching action and to impart or transfer heat to the cooler areas of the workpiece to minimize the self-quenching action of the adjacent back metal. A temperature slightly above the $M_s$ temperature, ranging for different steels between 400 and 1000 degrees F., has been found suitable for the salt bath.

The loss of heat to the salt bath from the areas heated above the critical range is very rapid. At the same time the cold back metal which was relatively unheated or not heated above the critical temperture is rapidly heated to the temperature of the salt, with the net effect that the entire piece is at a constant or gradually varying temperature prior to quenching. Thus, the temperature of the entire object is substantially uniform and any stresses resulting from the rapid cooling of the highly heated portions of the object can, to a large extent, relieve themselves before the martensite is formed by a subsequent cooling action. Forced circulation of the equalizing fluid may be provided, if desired, to increase the rate of surface heat transfer.

It has been found that this heat transfer before quenching is adequate to avoid sharp transition points which were so common before.

While one embodiment of the invention has been described in detail, it is to be understood that there may be various embodiment within the limits of the prior art and the scope of the subjoined claims.

What is claimed is:

1. The method of heat-and-quench hardening ferrous articles of manufacture which comprises rapidly heating very thin surface portions only of the article to a temperature above the austenizing temperature while a portion of the object remains below the austenizing temperature, simultaneously rapidly lowering the temperature of the heated portion to a temperature slightly above the $M_s$ temperature while at the same time heating the unheated portions of the article above the $M_s$ temperature, continuing this simultaneous cooling and heating until substantially the entire object is approximately at the same temperature and further quenching the workpiece to a temperature below the $M_r$ temperature.

2. The method of heat-and-quench hardening ferrous articles of manufacture which comprises rapidly heating surface portions only of the article to a temperature above the austenizing temperature while a portion of the article remains below the austenizing temperature, simultaneously and very rapidly lowering the temperature of the heated portion to a temperature slightly above the $M_s$ temperature while, at the same time, heating the unheated portions of the article to a temperature generally in the vicinity of the $M_s$ temperature, continuing this simultaneous cooling and heating until substantially the entire article is approximately at the same temperature and further cooling the entire workpiece to a temperature substantially below the $M_s$ temperature.

ANTON WM. HERBENAR.

REFERENCES CITED

The following references are of record in the file of this patent:

UNITED STATES PATENTS

| Number | Name | Date |
|---|---|---|
| 1,687,656 | Brown | Oct. 16, 1928 |

OTHER REFERENCES

Publication, The Iron Age, pp. 50–52, January 28, 1943, and pp. 45–48, February 4, 1943.